(12) United States Patent
Happ (10) Patent No.: US 11,548,008 B2
(45) Date of Patent: Jan. 10, 2023

(54) LABORATORY LIQUID HANDLER HEAD CHECK PLANARITY GUIDE

(71) Applicant: Labcon, North America, Petaluma, CA (US)

(72) Inventor: Venus Happ, Sonoma, CA (US)

(73) Assignee: Labcon, North America, Petaluma, CA (US)

( * ) Notice: Subject to any disclaimer, the term of this patent is extended or adjusted under 35 U.S.C. 154(b) by 401 days.

(21) Appl. No.: 16/513,940

(22) Filed: Jul. 17, 2019

(65) Prior Publication Data

US 2020/0023369 A1     Jan. 23, 2020

Related U.S. Application Data

(60) Provisional application No. 62/699,511, filed on Jul. 17, 2018.

(51) Int. Cl.
    *B01L 99/00*      (2010.01)
    *B01L 9/00*      (2006.01)
    *B01L 3/00*      (2006.01)

(52) U.S. Cl.
CPC ............ *B01L 9/543* (2013.01); *B01L 3/50* (2013.01); *B01L 9/56* (2019.08); *B01L 2200/025* (2013.01); *B01L 2200/0642* (2013.01); *B01L 2300/0609* (2013.01); *B01L 2300/123* (2013.01)

(58) Field of Classification Search
None
See application file for complete search history.

(56) References Cited

U.S. PATENT DOCUMENTS 6,321,476 B2    11/2001   Parini
2013/0312546 A1   11/2013   Wada

FOREIGN PATENT DOCUMENTS

WO     2018009689 A1    1/2018

OTHER PUBLICATIONS

International Search Report and Written Opinion dated Jan. 8, 2020 in International Patent Application No. PCT/US2019/042222.
Response to Office Action dated Aug. 24, 2021 in European Patent Application No. 19746413.4.
Examiner's Report dated Feb. 24, 2022 in Canadian Patent Application No. 3,106,529.

*Primary Examiner* — Paul S Hyun
(74) *Attorney, Agent, or Firm* — Vierra Magen Marcus LLP (57) ABSTRACT

A system is disclosed for measuring head framing and tip straightness in a liquid handler. The present system uses a test plate, having an upper surface formed of clay or other impressionable material. The test plate may be placed at a liquid handling station. Pipette tips may then be loaded onto the head, and the head positioned at the station including the test plate. The head may be actuated in the z-direction so that the tips leave an imprint in the upper surface of the test plate. The imprint of the tips on the test plate may then be analyzed using any of a variety of measurement techniques to determine head framing alignment or misalignment.

10 Claims, 13 Drawing Sheets

Fig. 7
(Step 610)

*Fig. 8*

Head-Plate Framing Error (X and Y)
*(Includes Head-Framing Error, Plate Positioning Error, Etc)*

Tip-Head Error

(*Filters Out* Head-Framing Error, Plate Positioning Error, Etc)

Fig. 13

# LABORATORY LIQUID HANDLER HEAD CHECK PLANARITY GUIDE

PRIORITY CLAIM

The present application claims priority to U.S. Provisional Patent Application No. 62/699,511, filed on Jul. 17, 2018 entitled "LABORATORY LIQUID HANDLER HEAD CHECK PLANARITY GUIDE," which application is incorporated by reference herein in its entirety.

BACKGROUND

Liquid handling tools are used in laboratories for dispensing a selected quantity of reagent, samples or other liquid to designated containers arrayed in an x-y plane on the liquid handling tool. The liquid handler includes a head with an x-y array of pipette-receiving shafts. Pipette tips arranged in the same x-y array may be loaded from a storage tray at a tip load station onto the shafts. The head may then move the pipette tips over containers, or wells, arrayed in a well plate at a well plate station to aspirate liquid samples for transfer to another location.

An issue common to all liquid handlers is that they need to be properly "framed." That is, when the head of the liquid handler goes to a given position (tip load station, or a well plate station), the head needs to be correctly located (or "framed") relative to the target position below, in both the x and y directions, and rotationally in the x-y plane. Poor machine framing can lead to issues such as pipette tips not mounting properly on the handler shafts, tips not entering the target-wells of a well plate properly, or well plates lifting off the deck of the liquid handler when retracting tips from it. A related issue is that when using pipet tips, the tips themselves need to be straight, and they need to mount straight, which often does not happen if the head is not properly framed to pipette tips at the tip loading station.

SUMMARY

The present technology relates to a system for measuring head framing and tip straightness in a liquid handler. The present system uses an impressionable test plate, having an upper surface formed of clay or other inelastically impressionable material. The test plate may be placed at a liquid handling station. Pipette tips may then be loaded onto the head, and the head positioned at the station including the test plate. The head may be actuated in the z-direction so that the tips leave an imprint in the upper surface of the test plate. The imprint of the tips on the test plate may then be analyzed using any of a variety of measurement techniques including by a vision measuring machine (VMM) or coordinate measuring machine (CMM) to determine head framing alignment or misalignment.

In embodiments, the present technology relates to a test plate for a liquid handler, the test plate comprising: a rigid base configured with a size to fit at a station of the liquid handler; and a pliable layer including a surface configured to receive an imprint of pipette tips positioned on a head of the liquid handler, the imprint remaining in the surface for analysis of positions of a dispensing end of the pipette tips.

In further embodiments, the present technology relates to a liquid handler for dispensing liquid samples, comprising: a station for receiving labware configured to receive liquid samples; a head configured to receive pipette tips and to translate toward and away from the station; and a test plate comprising: rigid base configured with a size to fit at a station of the liquid handler; and a pliable layer including a surface configured to receive an imprint of pipette tips positioned on a head of the liquid handler, the imprint remaining in the surface for analysis of positions of a dispensing end of the pipette tips.

In another embodiment, the present technology relates to a system for measuring alignment of pipette tips at a station of a liquid handler, comprising: a test plate for receiving imprints of dispensing ends of a plurality of pipette tips mounted on a head of the liquid handler; and one or more processors executing code configured to: receive locations of pipette tip imprints, determine an error in a position of the head relative to the station, and determine errors in positions of the dispensing ends of the pipette tips relative to the head.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present technology, roughly described, relates to a system for measuring head framing and tip straightness in a liquid handler. A liquid handler may have one or more stations at which a piece of labware, such as a microplate, is positioned to receive liquid specimens from pipette tips mounted on a head of the liquid handler. A station may include guides for receiving and positioning a piece of labware having a footprint defined by the Society for Biomolecular Sciences (SBS) standard. The present technology provides a test plate including an impressionable surface. The test plate may be placed at a station, and pipette tips may be loaded onto the head at that station. The head may be actuated in the z-direction so that the tips leave an imprint in the upper surface of the test plate. The imprint of the tips on the test plate may then be analyzed using any of a variety of measurement techniques including by a vision measuring machine (VMM) or coordinate measuring machine (CMM) to determine head framing alignment or misalignment.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

Figure 1:
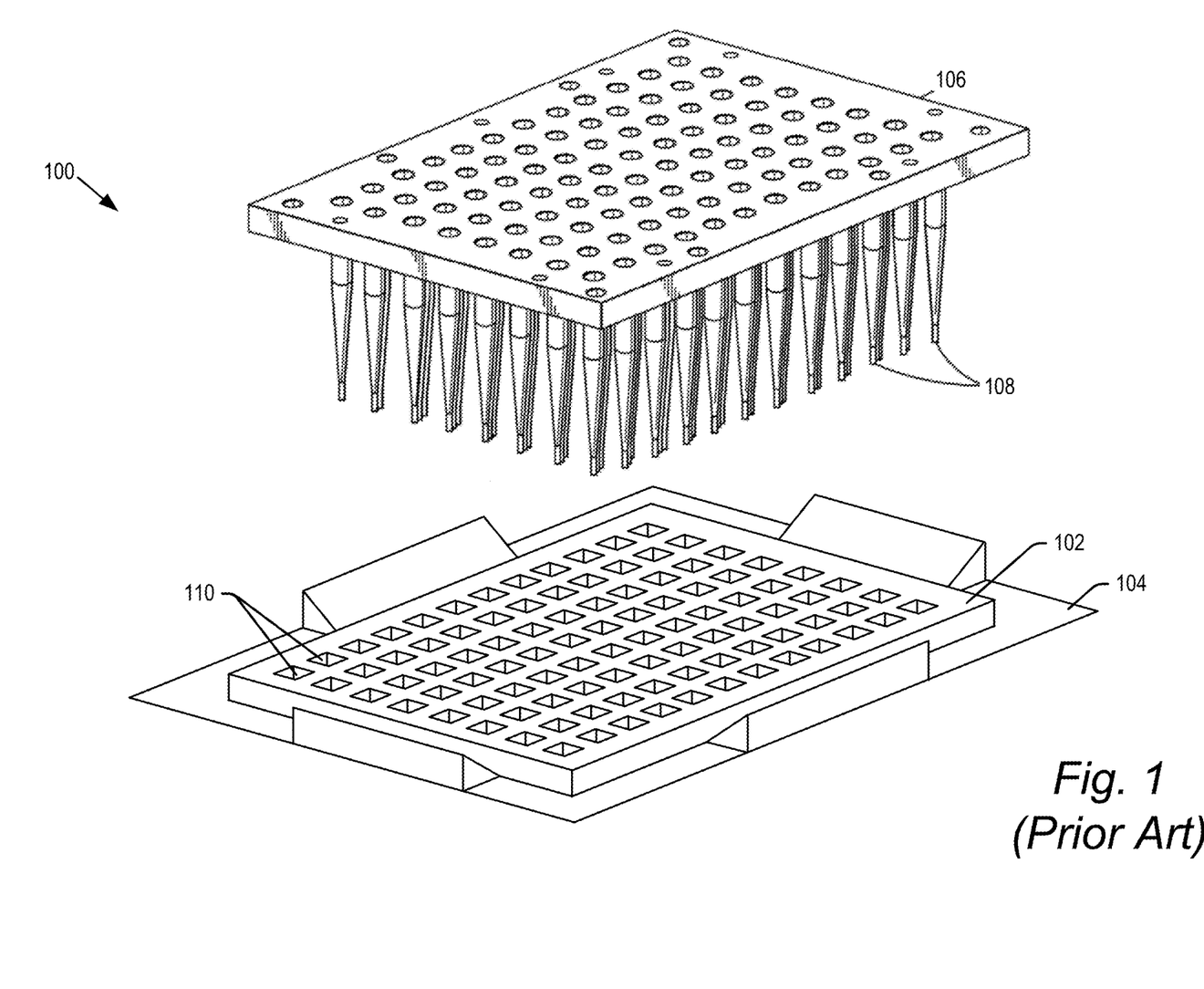
FIG. 1 illustrates a view of a conventional liquid handler including pipette tips on a head and a piece of labware on a station.

FIG. 1 shows a conventional liquid handler 100 including piece of labware 102, a microplate in this example, positioned at a station 104. It is understood that the labware may be any of a variety of other pieces of labware, including for example a lab rack having pipette tips, other types of plates, etc. Additionally, while FIG. 1 shows labware 102 and station 104 having a particular SBS footprint, it is understood that the labware 102 and station 104 may have other footprints (SBS or otherwise) in further embodiments.

The liquid handler 100 further includes a head 106 on which is positioned a plurality of pipette tips 108 for dispensing liquid specimens into the wells 110 of the labware 102. In particular, the head 106 is mounted on a drive (not shown) which translates the head 106 and the pipette tips downward along the z-direction until bottom ends of the pipette tips are adjacent a surface of the labware 102. The bottom ends of the pipette tips are referred to herein as the dispensing end of the pipette tips. With the dispensing end of the pipette tips at the labware, a pressure is applied (or a negative pressure is removed) at the upper ends of the pipette tips 108 to dispense liquid from the pipette tips 108 into respective wells 110 of the labware 102.

As noted in the Background section, it is important that the labware 102 be properly registered, or framed, with respect to the pipette tips 108. Misalignment of the head 106 to the labware 102, or misalignment of the dispensing ends of the pipette tips 108 to the head 106, can cause liquid to be dispensed in the wrong well 110, or onto a sidewall between the wells 110.

Figure 2:
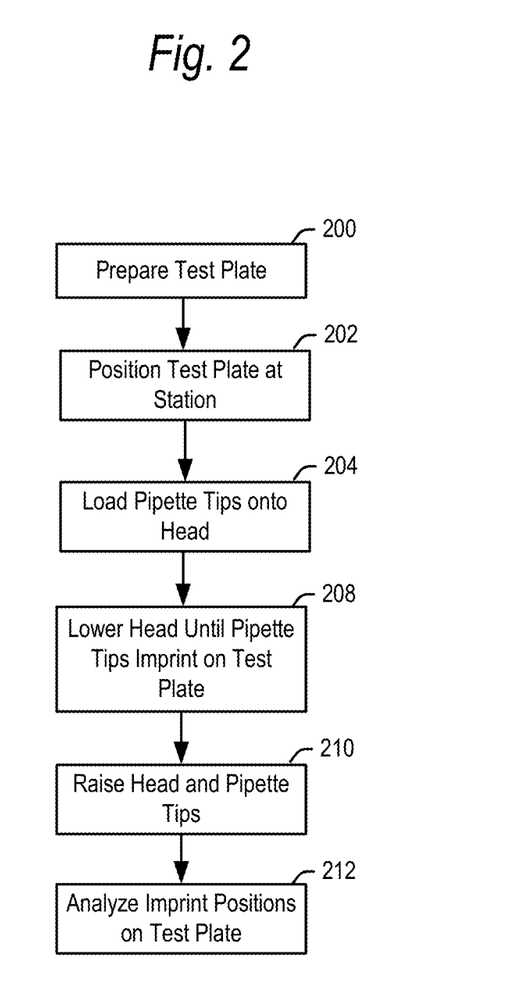
FIG. 2 is a flowchart for the operation of obtaining imprints on a test plate according to embodiments of the present technology.

Therefore, in accordance with the present invention, a calibration procedure may be performed to determine any misalignment of the head 106 to the labware 102 and/or any misalignment of the pipette tips 108 to the head 106. The calibration procedure will now be explained with reference to the flowchart of FIG. 2 and the views of FIGS. 3-5. In a step 200, a test plate may be prepared. An example of a test plate 120 is shown in FIG. 3, the test plate may comprise a rigid base 122 on which is provided a soft, impressionable layer 124.

The rigid base may be provided with the same SBS footprint as the labware 102 used at a particular station 104. Different sized bases 122 may be used for different SBS footprint stations 104. In embodiments, the base 122 may itself be a piece of labware 102 on top of which is formed the soft, pliable layer 124. The base 122 may simply be a plate having a footprint configured for the station 104 in further embodiments.

The soft, pliable layer 124 may have an inelastically deformable surface 126, meaning that, when one or more imprints are made in the surface 126, the imprints remain until a smoothing process is performed to once again flatten the surface 126. One suitable material for pliable layer is clay, though other materials are contemplated. The base 122 and pliable layer 126 may together have a thickness of between 0.25 to 1.0 inches, but may be thicker or thinner than that in further embodiments.

Figure 3:
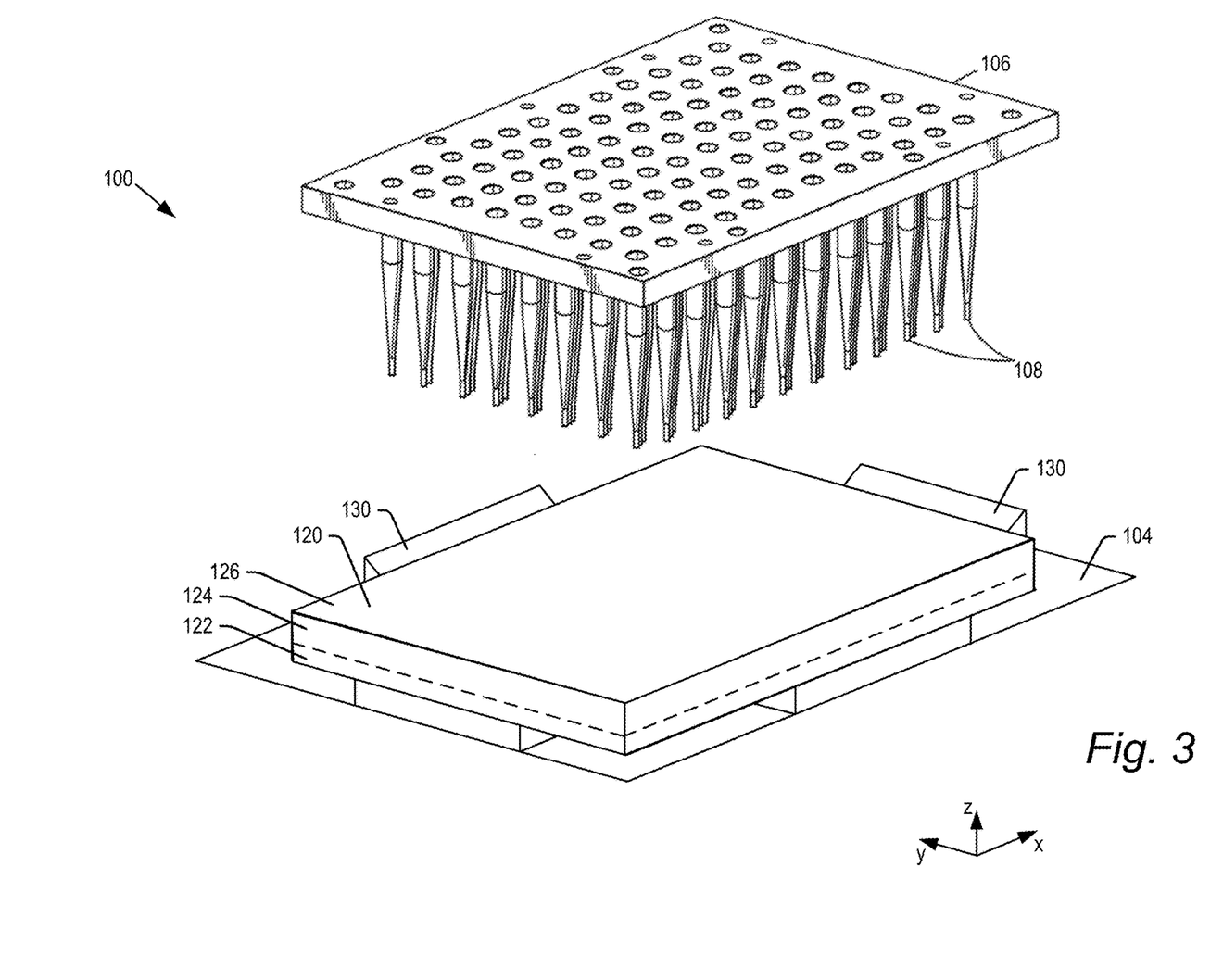
FIG. 3 illustrates a view of a test plate on a station. According to embodiments of the present technology.
Figure 4:
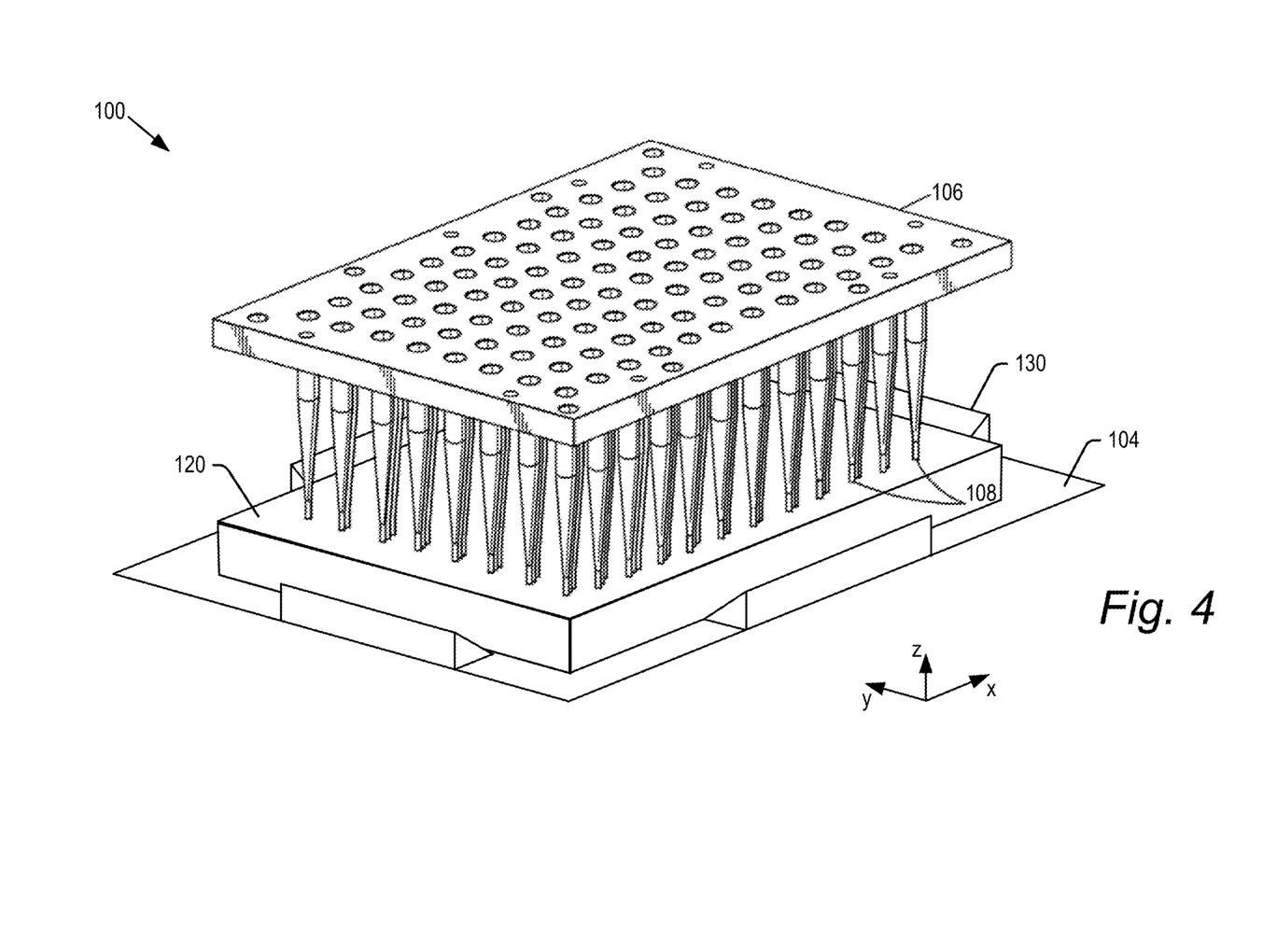
FIG. 4 illustrates a view of pipette tips on a head lowered down into contact with a surface of the test plate according to embodiments of the present technology.
Figure 5:
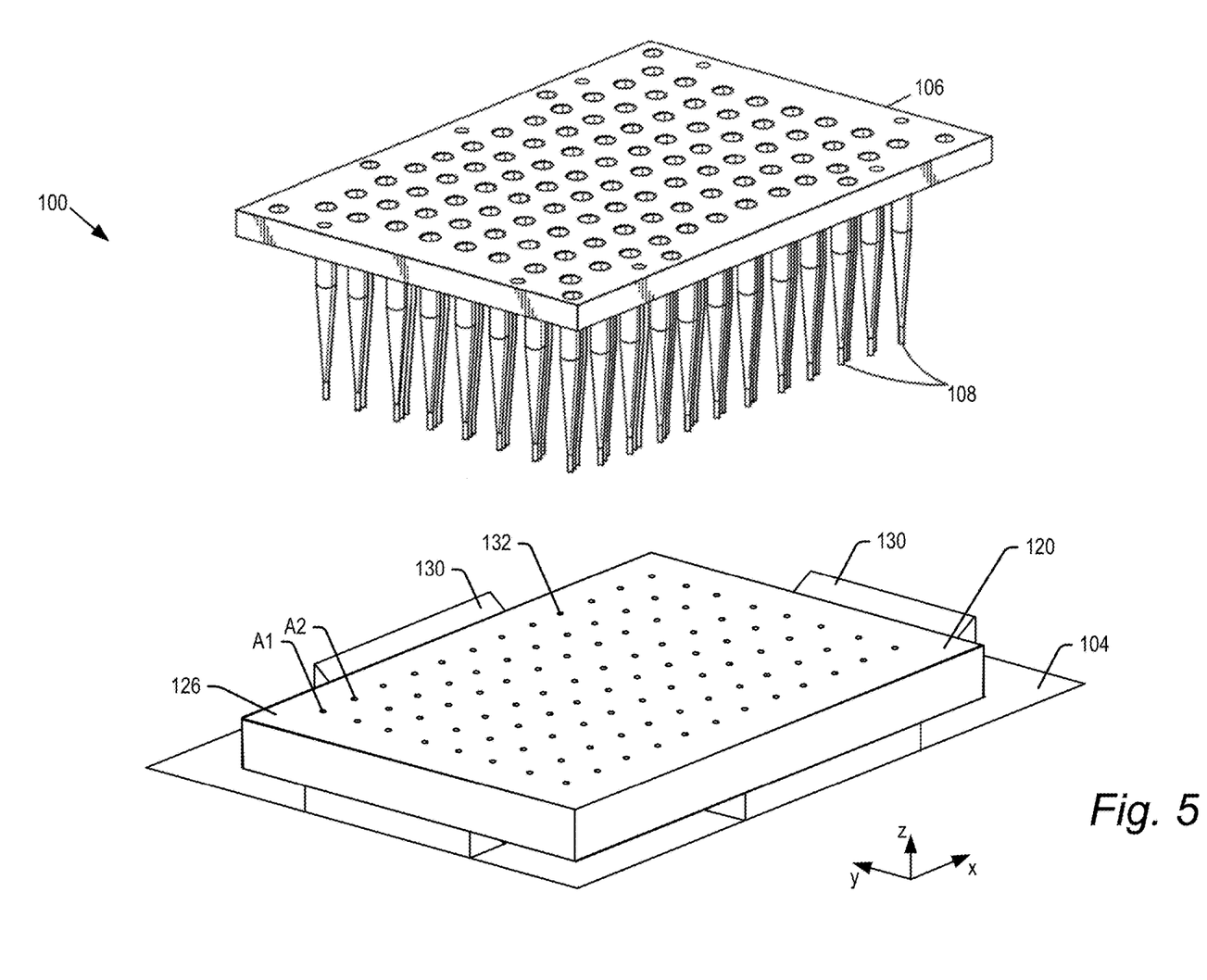
FIG. 5 illustrates a test plate according to embodiments of the present technology including imprints of the dispensing ends of a group of pipette tips.

In step 202, the test plate 120 may be positioned at a station 104 as shown in FIG. 3. The test plate 120 may be registered to a known position on the station 104, such as for example positioning one corner of the test plate squarely in contact with one corner of the station 104. While FIGS. 3-5 show the test plate 120 and station 104 having a particular SBS footprint, it is understood that the test plate 120 and station 104 may have other footprints (SBS or otherwise) in further embodiments. The station 104 may include guides 130, shown schematically in the figures, for centering the test plate 120 (and labware 102) at the proper position at the station 104. The guides 130 may have some tolerance (i.e., may be slightly larger than the SBS footprint for the station 104), which may be a source of misalignment.

The head 106 may be loaded with pipette tips 108 in step 204, and, with the test plate 120 positioned at the station 104, the head 106 and pipette tips 108 may be lowered in step 208 as shown in FIG. 4. The head may be lowered until the dispensing ends of the pipette tips 108 contact and leave imprints 132 in the surface 126. The head 106 and pipette tips 108 may then be raised in step 210 as shown in FIG. 5. The motion of the head 106 may be controlled by a software algorithm that controls lowering and raising of the head to leave an imprint of the desired depth with respect to the surface 126 of the test plate 120. In embodiments, this depth may be $1/16^{th}$ to $1/8^{th}$ of an inch, but the depth may be greater or lesser than that in further embodiments.

At the completion of steps 200-210, the imprints provide an actual indication of the positions of the dispensing ends of the pipette tips 108 to the test plate 120, and by extension, to the station 104. Where a standard number of pipette tips are used, there may be rectangular grid of 384 or 96 such imprints.

The positions of the imprints may next be analyzed in step 212 to determine the alignment/misalignment of the actual positions of the dispensing ends of the pipette tips to the expected positions of the dispensing ends of the pipette tips.

This analysis may further provide an indication of whether any misalignment of a given pipette tip to the expected position is due to head/station misalignment or head/tip warp. Further detail of the analysis of step 212 will now be explained with reference to the flowcharts of FIGS. 6-7 and the charts and graphs of FIGS. 8-13.

Figure 6:
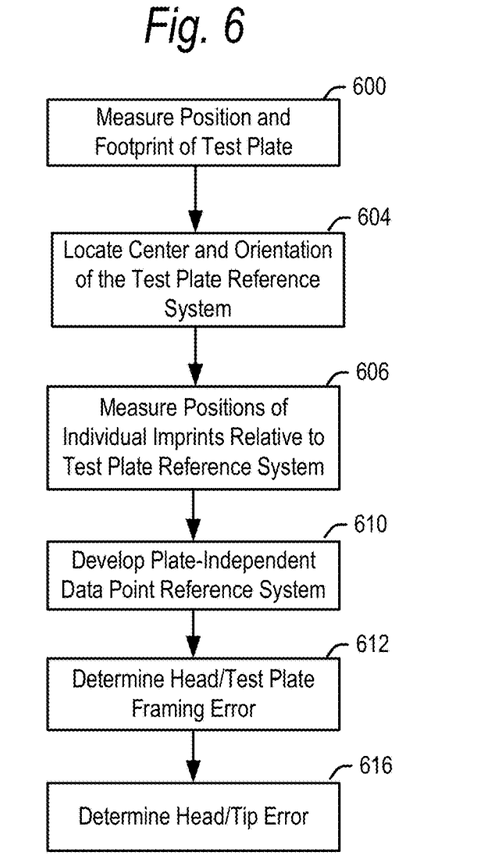
FIG. 6 is a flowchart illustrating steps in the analysis of the pattern of imprints on a test plate according to embodiments of the present technology.

In step 600, the position and footprint of the test plate are optically measured. The optical measurements in step 600 and in the steps that follow may be performed by a variety of measurement techniques including by a vision measuring machine (VMM) or coordinate measuring machine (CMM). The center of the station is known. Using the measured footprint of the test plate, a center and orientation of the test plate reference system is determined in step 604 and assigned an origin (coordinate (0,0)). The center of the test plate reference system may arbitrarily be positioned at some other point, such as at the lower left corner of the test plate reference system.

In step 606, the positions of each individual imprint is optically determined relative to the test plate reference system. These positions represent a 2D dataset of the x,y positions of each imprint in a plane of the surface 126 of the test plate 120. As an example, in a 384-channel situation, the imprint at A1 (top-left corner of the plate in FIG. 5) should be located at [−51.75 mm, +33.75 mm] relative to the center of the test plate. The imprint to the right of that (position A2) should be located at [−47.25 mm, +33.75 mm]. And so on, if each pipette tip followed the ideal 4.5 mm pitch between tips (or wells) in a 384-format environment. The actual positions of the imprints 132 may, and likely will, vary from the ideal expected positions. As another example, in a 96-channel situation, the imprint located at A1 should be located at [−49.5 mm, +31.5 mm], the imprint at A2 should be at [−40.5 mm, +31.5 mm], and so on, following the ideal 9 mm pitch in a 96-channel environment.

In step 610, using all of the 2D data points in the dataset, a new reference system is developed which is independent of the test plate and references only to the imprint data points. This reference system is referred to herein as the point reference system. Each data point represents the (x, y) coordinate of each imprint on the test plate 120. The determination of the point reference system is based on an assumption that any tip warp across a rack of tips is oriented randomly. That is, across a set of sample tips, any given pipette tip is just as likely to be warped "north" in the rack as it is to be warped "south" (or "east" or "west," etc.). As used herein, tip warp may include a bend in the pipette tip and/or a straight pipette tip that is affixed to the head with some angular skew. Using this assumption, the point reference system may be determined in step 610. Further details of step 610 will now be explained with reference to the flowchart of FIG. 7.

Figure 7:
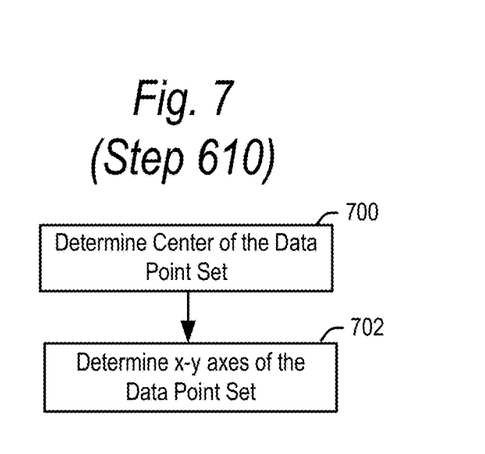
FIG. 7 is a flowchart illustrating additional details of step 610 according to embodiments of the present technology.

In step 700, a center of the data point set is determined. This may be done by taking the average x coordinate positions and the average coordinate positions for all data points in the dataset. If all of the data points were perfectly aligned to their ideal positions, these points will all geometrically average to (0,0) relative to the SBS test plate footprint. In reality, this is unlikely.

In step 702, the actual x and y axes of the dataset is determined, for example using a regression best-fit analysis. The purpose is that the data points are unlikely to perfectly square up with the x and y axes of the test plate. The actual axes are going to be rotated by some amount. This amount is determined in step 702.

Referring again to the flowchart of FIG. 6, the difference between the test plate reference system (step 606) and the point reference system (step 610) is determined in step 612. This difference provides the head/test plate framing error. The head/test plate framing error comprises the error in the x position, y position and rotation about the x, y plane of the test plate relative to an ideal position for the given head position. That is, how far out of position (relative to the ideal) the test plate 120 is relative to the head 106.

Head/test plate framing error may be considered a "system" framing error, since it includes not only the framing error of the head itself (classic "head framing"), but also test plate positional error. A simple way to filter out test plate positioning error and isolate/identify true head framing error is to eliminate the plate positioning error entirely. This can be done by making a custom test plate which has an SBS footprint which matches the SBS pocket dimensions provided by the guides 130 at station 104. A test plate with this SBS footprint would have zero play at the station and theoretically zero plate positional error. Therefore, any head/plate framing error identified is true head position error due to an error in the head position.

A similar effect can be accomplished without making a custom fit plate, even with a loose-fitting plate, by running the above steps of FIG. 6 multiple times, with the test plate pushed into one corner of the SBS pocket, and then running the above steps of FIG. 6 multiple times again, with the test plate pushed into the opposite corner, and averaging out the head/plate framing error results.

With the head/test plate frame error determined, the individual error (warp) of each pipette tip relative to the head may next be determined. This determination provides head/tip error (step 616). In step 616, the positions of each data point (each imprint) are determined relative to the point reference system. In particular, when the positions of the data points were initially measured in step 606, their positions were measured relative to the test plate reference system. These positions are determined relative to the point reference system in step 616.

In so doing, head framing error is filtered out. That is, the individual, actual imprint positions of each data point are being examined relative to their expected ideal positions for the whole data set. The head/tip error provides the actual warp for each individual pipette tip. The position of the test plate relative to the head does not factor into this analysis.

As an example, as noted above, the imprint at A1 (in the 384 tip environment of FIG. 5) is expected to be at [−51.75 mm, +33.75 mm] relative to point reference system, and the imprint of A2 is expected to be 4.5 mm over in the x direction, etc. If, for example, the actual position of A1 is determined to be located at [−51.69 mm, +33.78] (relative to the point reference system), it is determined that the dispense end of the pipette tip at A1 was out of position by [+0.06 mm, +0.03 mm]. Using trigonometry and the Pythagorean Theorem, a vector may be determined giving the angle and magnitude of warp of the tip at A1.

Step 616 is performed on the remaining data points to determine the head/tip error for the remaining imprints 132 on the test plate 120. Armed with the head/test plate error and the head/tip error, a variety of information can be determined and/or inferred. For example, from a statistical perspective, in addition to the warp of individual pipette tips, the average warp can be determined across all pipette tips, which pipette tips have the worst warp, and the data can be broken down into distribution charts to characterize the warp of a given rack of pipette tips. Additionally, all error vectors can be charted to determine whether there are any patterns.

Figure 8:
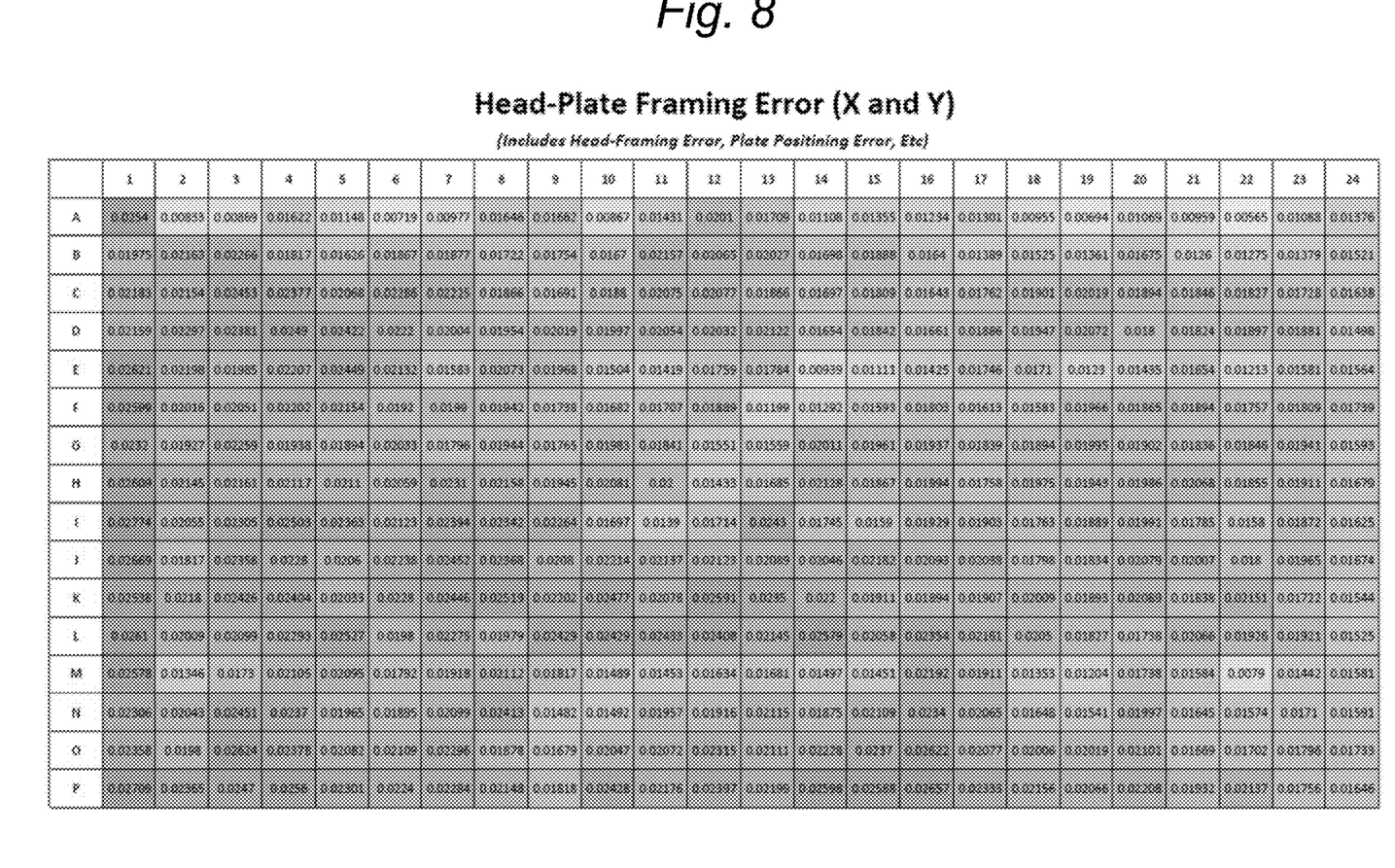
FIG. 8 is a graph showing head/test plate framing error for each point in the data set of points corresponding to imprints on the test plate according to embodiments of the present technology.
Figure 9:
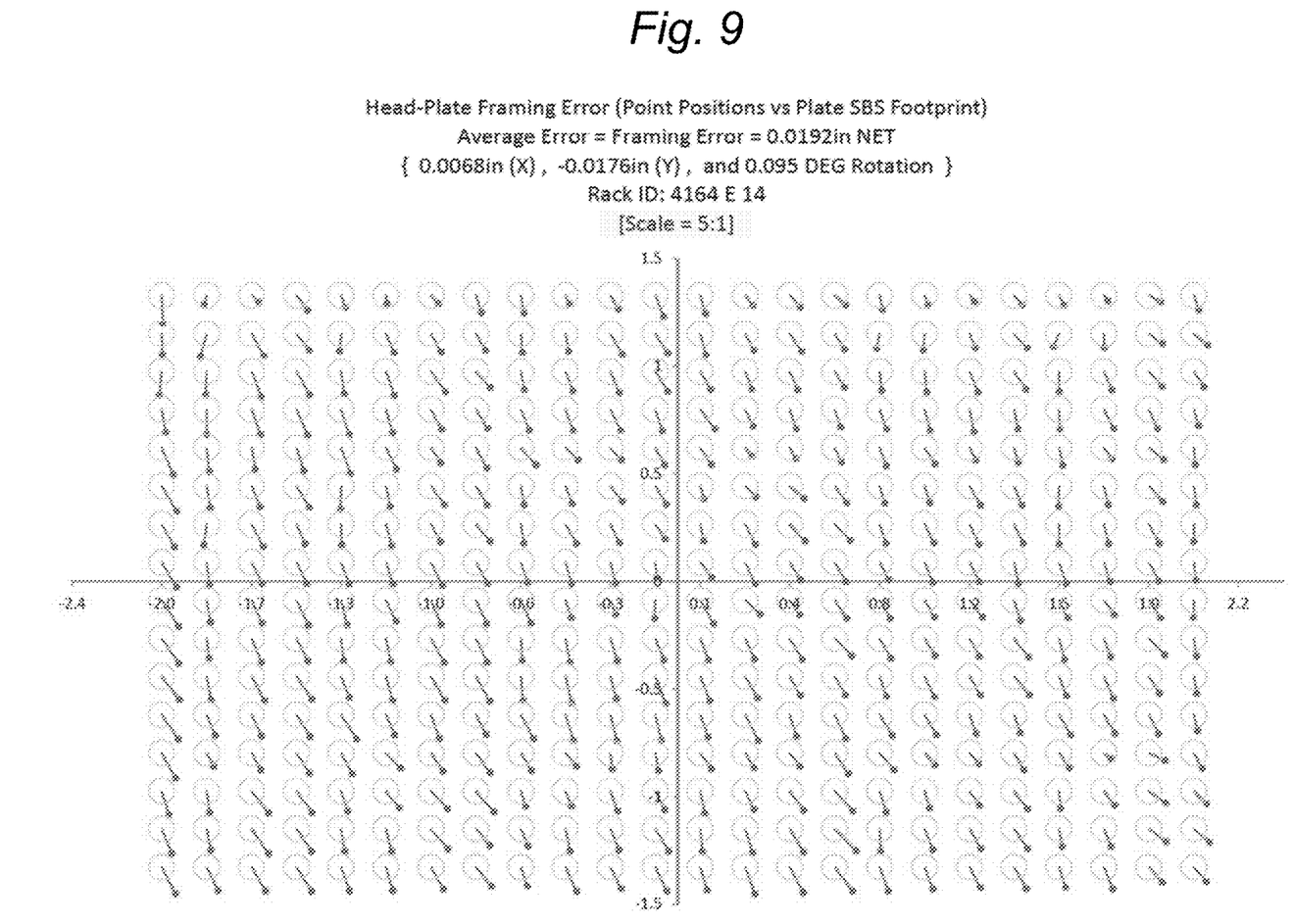
FIG. 9 is a graph showing vector values for the head/test plate framing error of FIG. 8.

FIG. 8 is a chart showing numerical values for head/plate framing error in one example of imprints 132 on a test plate 120. The head/plate framing error at each point includes head framing error, plate positioning error and head/tip error. In addition to the numerical values shown, darker shaded points in the dataset represent higher head/plate framing error. FIG. 9 is a further chart showing vector values for head/plate framing error in the example of FIG. 8.

Figure 10:
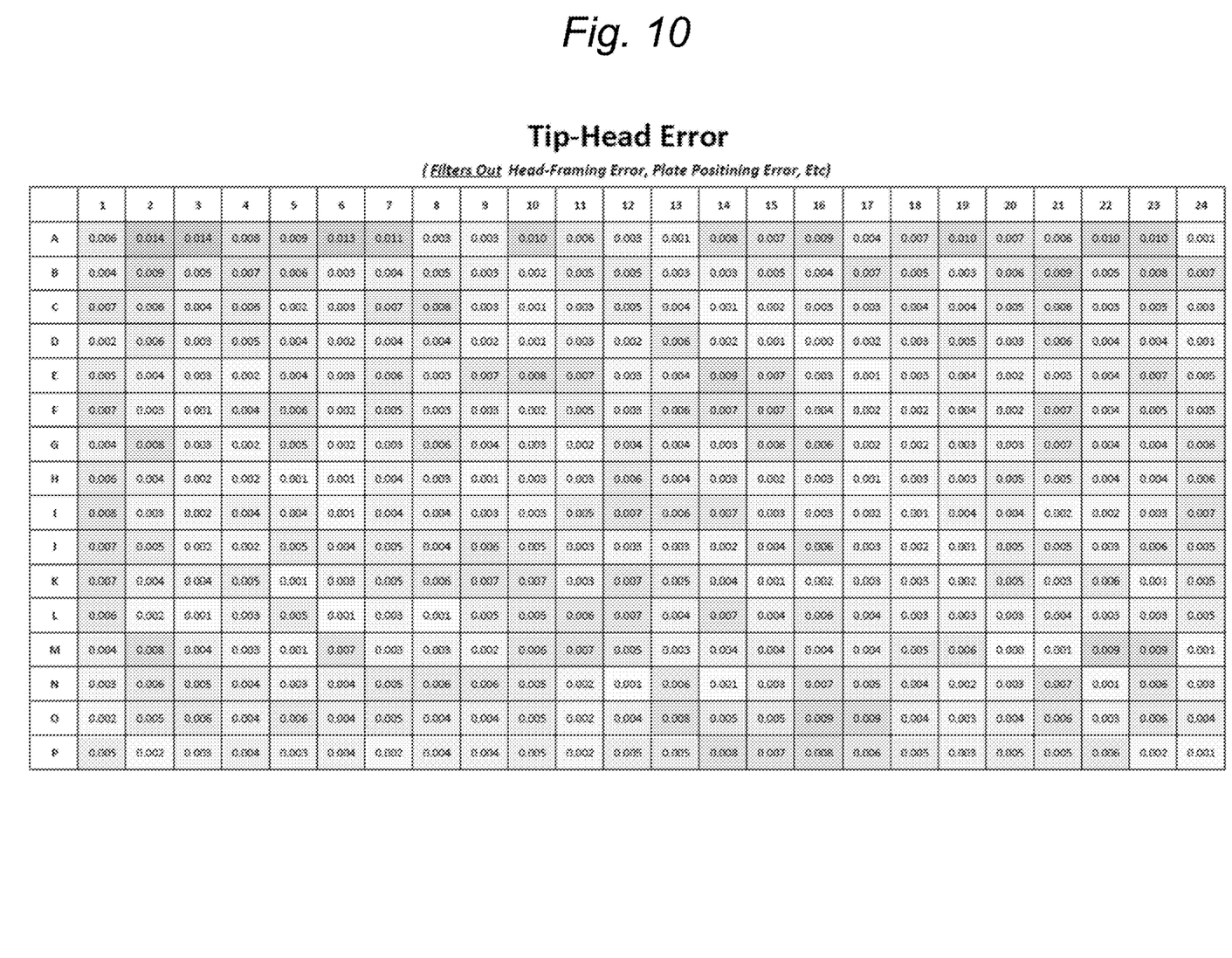
FIG. 10 is a graph showing head/tip error for each point in the data set of points corresponding to imprints on the test plate according to embodiments of the present technology.
Figure 11:
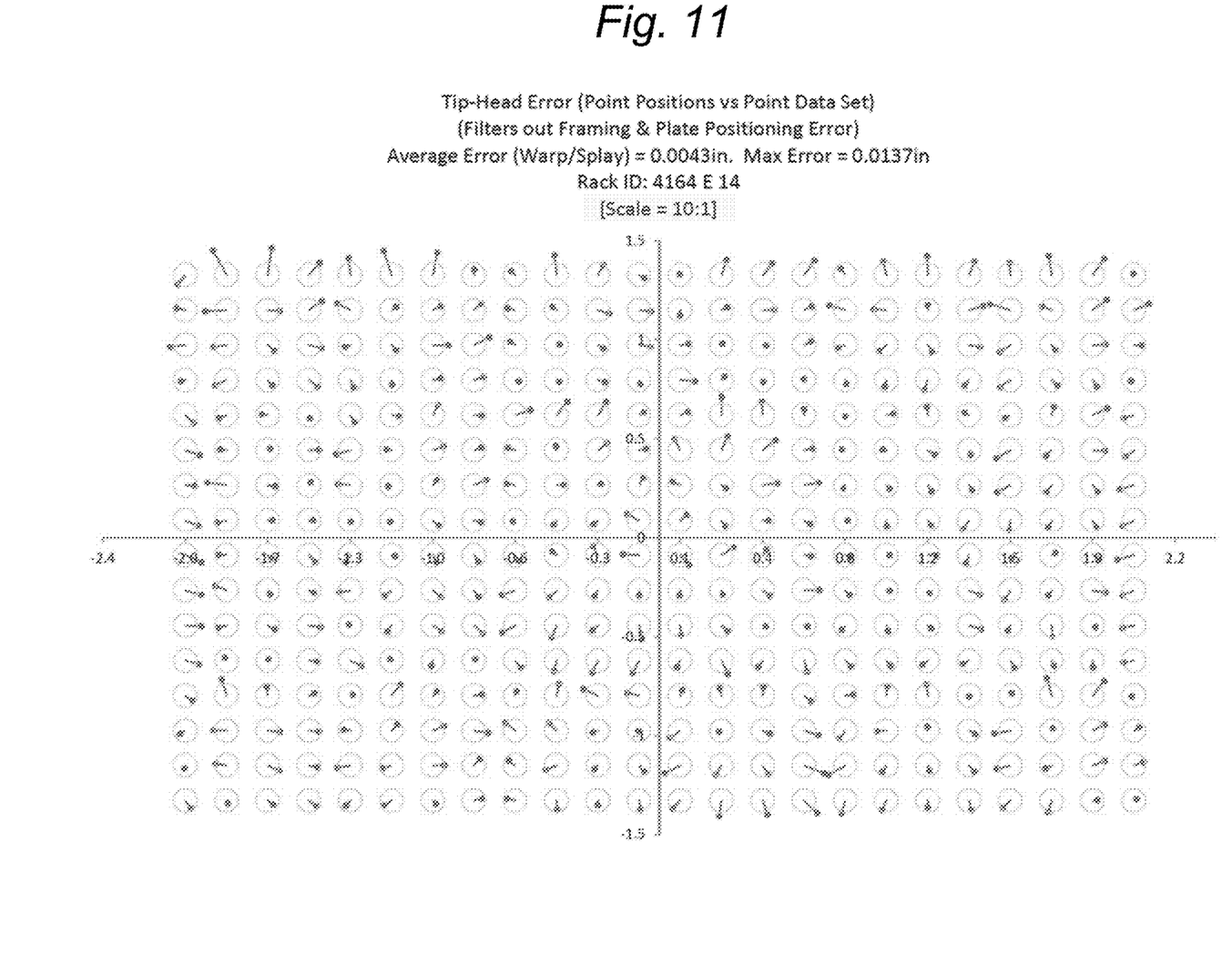
FIG. 11 is a graph showing vector values for the head/test plate framing error of FIG. 10.

FIG. 10 is a chart using the same data as in FIG. 8, but showing just the head/tip error (i.e., with the head/plate framing error filtered out). As above, in addition to the numerical values shown, darker shaded points in the dataset represent higher head/tip framing error. FIG. 11 is a further chart showing vector values for the head/tip framing error in the example of FIG. 10. The charts of FIGS. 8-11 can be analyzed for patterns which may yield information as to head/tip framing error results.

Figure 12:
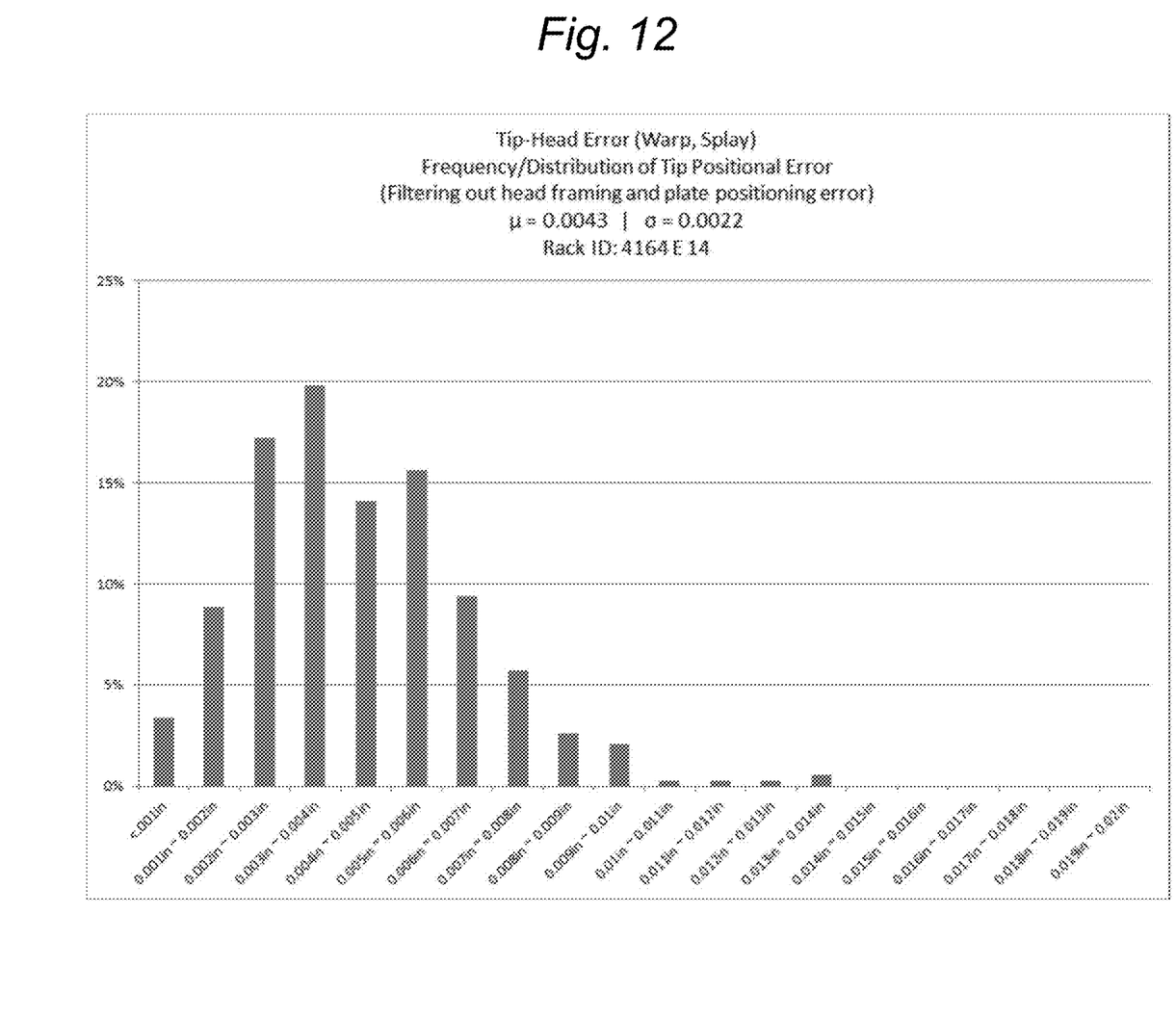
FIG. 12 is a frequency/distribution graph showing head/tip error.
Figure 13:
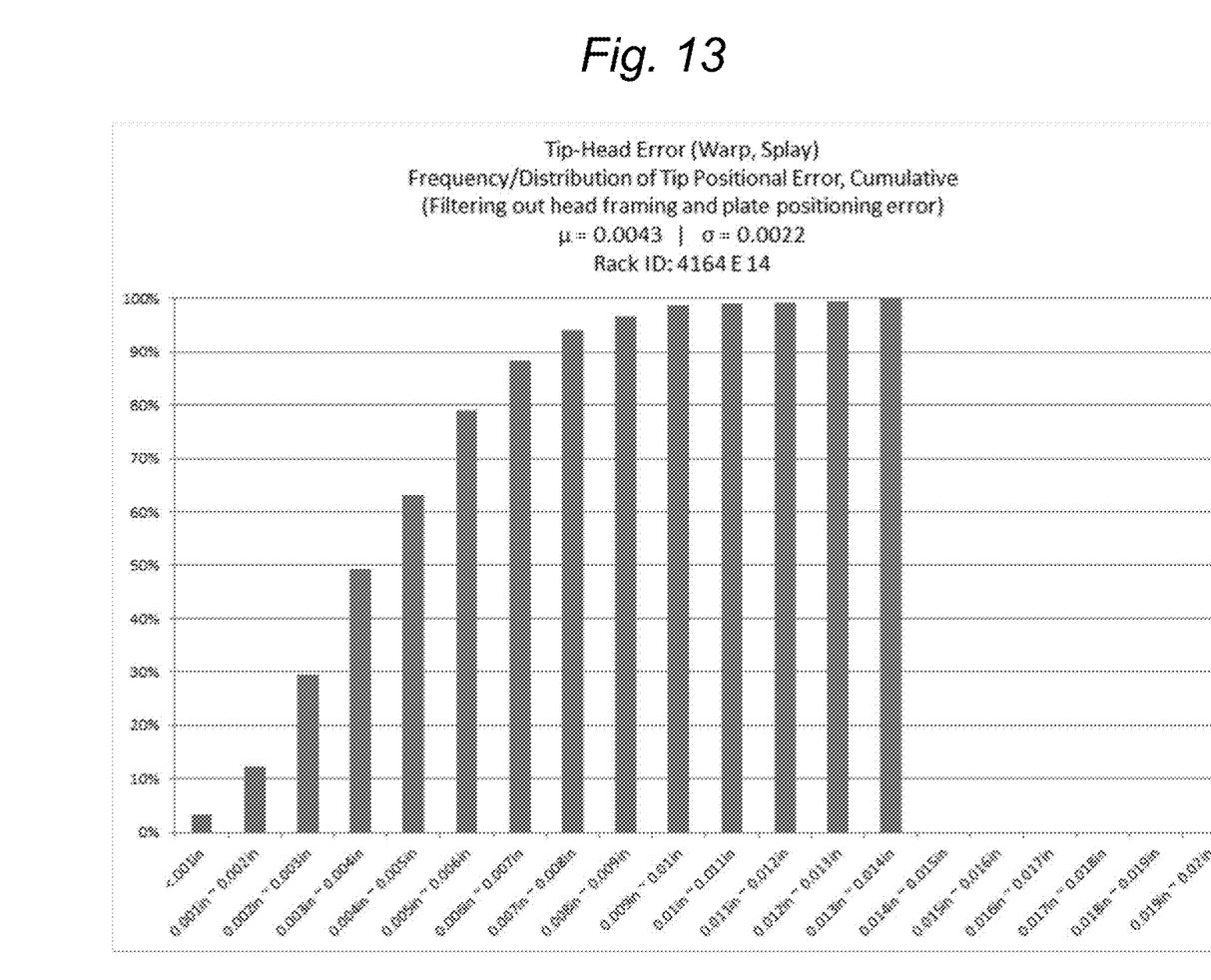
FIG. 13 is a cumulative frequency/distribution graph showing head/tip error.

FIGS. 12 and 13 show additional information which can be gleaned from the charts of FIGS. 8-11. FIG. 12 shows the frequency/distribution of tip positional error resulting from warp. In the chart of FIG. 12, head framing and plate positioning error filtered out. FIG. 13 also shows the frequency/distribution of tip positional error resulting from warp, but is cumulative over all points in the dataset.

The information provided by test plate 120 and the analysis shown in FIGS. 6-13 may provide technicians with the ability to better position pipette tips 108 with respect to labware 102 at a liquid handler station 104. For example, the head/test plate framing error may be used to correct the position of a head 106 relative to a station 104. Additionally, where a consistent pattern of head/tip warp errors is indicated by the test plate imprints 132, this may be used to correct the process of loading pipette tips onto the head.

Upon completion of the analysis of the positions of the imprints 132 on the test plate 120, the upper surface of the test plate may be rolled flat, for example with a roller, so that the test plate 120 may be reused in further framing analyses.

Figure 14:
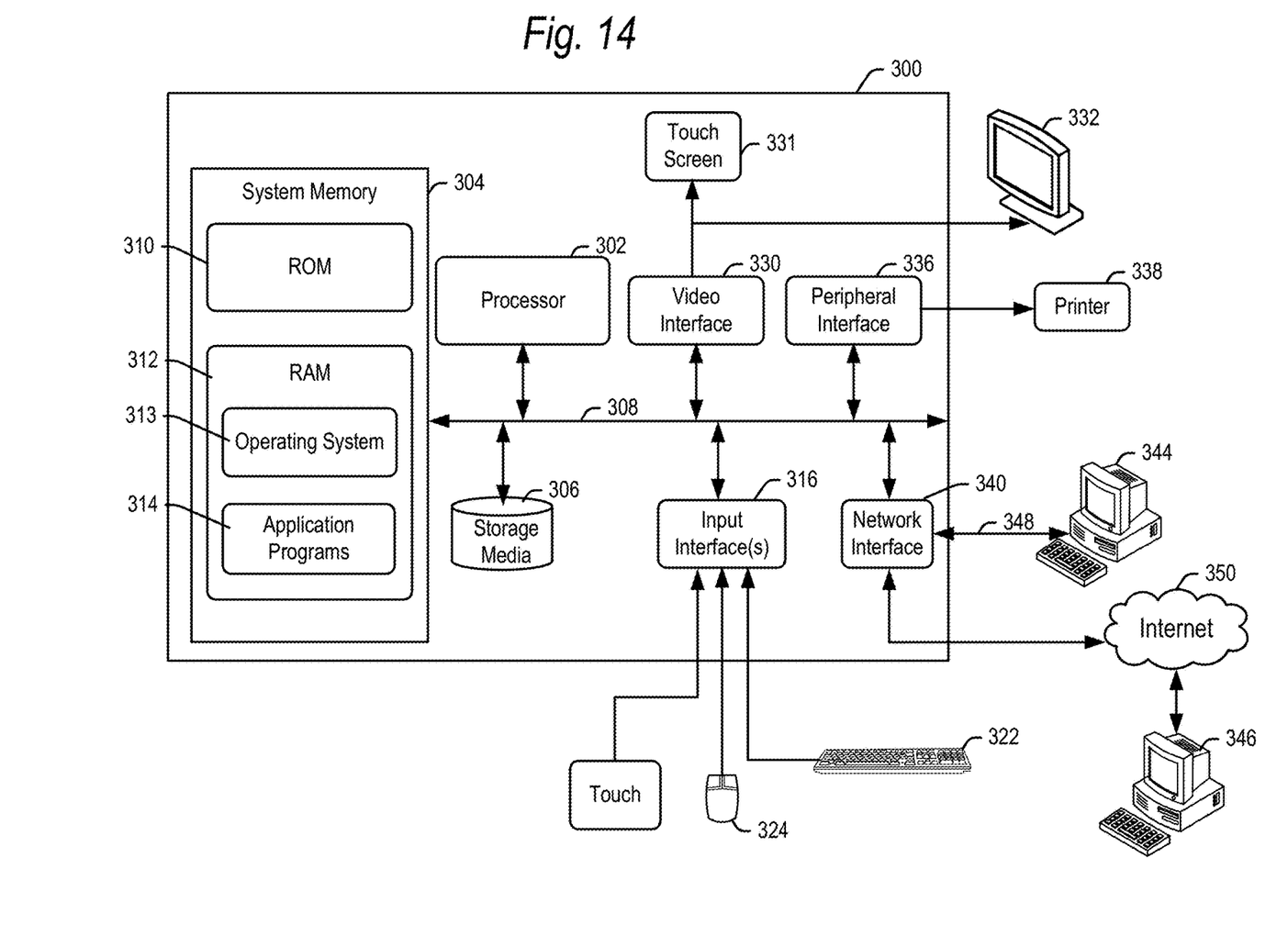
FIG. 14 is a block diagram of an example of a computing environment capable of performing the analyses of the present technology.

FIG. 14 illustrates details of a computing environment 300 capable of performing the analysis of the test plate 120 as described above. In embodiments, the computing environment 300 may be incorporated into a vision measuring machine (VMM) or coordinate measuring machine (CMM) for determining head framing alignment or misalignment. In further embodiments, the computing environment 300 may be separate from the VMM and/or CMM, and may receive information from the VMM and/or CMM.

Components of computing environment 300 may include, but are not limited to, a processor 302, a system memory 304, computer readable storage media 306, various system interfaces and a system bus 308 that couples various system components. The system bus 308 may be any of several types of bus structures including a memory bus or memory controller, a peripheral bus, and a local bus using any of a variety of bus architectures.

The computing environment 300 may include computer readable media. Computer readable media can be any available tangible media that can be accessed by the computing environment 300 and includes both volatile and nonvolatile media, removable and non-removable media. Computer readable media does not include transitory, modulated or other transmitted data signals that are not contained in a tangible media. The system memory 304 includes computer readable media in the form of volatile and/or nonvolatile memory such as ROM 310 and RAM 312. RAM 312 may contain an operating system 313 for computing environment 300. RAM 312 may also execute one or more application programs 314, including for example the policy agent 140.

The computer readable media may also include storage media 306, such as hard drives, optical drives and flash drives.

The computing environment 300 may include a variety of interfaces for the input and output of data and information. Input interface 316 may receive data from different sources including touch (in the case of a touch sensitive screen), a mouse 324 and/or keyboard 322. A video interface 330 may be provided for interfacing with a touchscreen 331 and/or monitor 332, such as display 160. A peripheral interface 336 may be provided for supporting peripheral devices, including for example a printer 338.

The computing environment 300 may operate in a networked environment via a network interface 340 using logical connections to one or more remote computers 344, 346. The logical connection to computer 344 may be a local area connection (LAN) 348, and the logical connection to computer 346 may be via the Internet 350. Other types of networked connections are possible, including broadband communications as described above. It is understood that the above description of computing environment 300 is by way of example only, and may include a wide variety of other components in addition to or instead of those described above.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A test plate for a liquid handler, the test plate comprising:
    a rigid base configured with a size to fit at a station of the liquid handler; and
    a pliable layer, uniform through its depth and including an inelastically deformable surface configured to receive an imprint of pipette tips positioned on a head of the liquid handler, the imprint remaining in the surface for analysis of positions of a dispensing end of the pipette tips;
    wherein the base has a footprint conforming to the footprint of a Society for Biomolecular Sciences standard.

2. The test plate of claim 1, wherein the base is a piece of labware configured to receive liquid samples at the liquid handler.

3. The test plate of claim 1, wherein the pliable layer is formed of clay.

4. A liquid handler for dispensing liquid samples, comprising:
    a station for receiving labware configured to receive liquid samples;
    a head configured to receive pipette tips and to translate toward and away from the station; and
    a test plate comprising:
        a rigid base configured with a size to fit at the station of the liquid handler; and
        a pliable layer, uniform through its depth and including an inelastically deformable surface configured to receive an imprint of pipette tips positioned on the head of the liquid handler, the imprint remaining in the surface for analysis of positions of dispensing ends of the pipette tips.

5. The liquid handler of claim 4, wherein the base has a footprint conforming to the footprint of a Society for Biomolecular Sciences standard.

6. The liquid handler of claim 4, wherein the base is a piece of labware configured to receive liquid samples at the liquid handler.

7. The liquid handler of claim 4, wherein the pliable layer is formed of clay.

8. A liquid handler for dispensing liquid samples, comprising:
   a station for receiving labware configured to receive liquid samples;
   a head configured to receive pipette tips and to translate toward and away from the station; and
   a test plate comprising:
      a rigid base configured with a size to fit at the station of the liquid handler; and
      a pliable clay layer including a surface configured to receive an imprint of pipette tips positioned on the head of the liquid handler, the imprint remaining in the surface for analysis of positions of dispensing ends of the pipette tips.

9. The liquid handler of claim 8, wherein the base has a footprint conforming to the footprint of a Society for Biomolecular Sciences standard.

10. The liquid handler of claim 8, wherein the base is a piece of labware configured to receive liquid samples at the liquid handler.

* * * * *